United States Patent
Kolar et al.

(10) Patent No.: US 11,729,071 B1
(45) Date of Patent: Aug. 15, 2023

(54) SELECTION OF SAAS ENDPOINT INSTANCES BASED ON LOCAL SERVICE PROVIDER CONNECTIVITY STATISTICS

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/190,811

(22) Filed: Mar. 3, 2021

(51) Int. Cl.
*H04L 41/5009* (2022.01)
*H04L 67/141* (2022.01)
*H04L 41/50* (2022.01)
*H04L 67/10* (2022.01)

(52) U.S. Cl.
CPC ...... *H04L 41/5009* (2013.01); *H04L 41/5032* (2013.01); *H04L 67/141* (2013.01); *H04L 67/10* (2013.01)

(58) Field of Classification Search
CPC ............. H04L 41/5009; H04L 41/5032; H04L 67/141; H04L 67/10
See application file for complete search history.

(56) References Cited

U.S. PATENT DOCUMENTS

| | | | |
|---|---|---|---|
| 10,602,388 B1 * | 3/2020 | Rengarajan | H04L 43/0852 |
| 10,897,424 B1 * | 1/2021 | Dhanabalan | H04L 45/302 |
| 2015/0348065 A1 | 12/2015 | Doganata et al. | |
| 2018/0359172 A1 * | 12/2018 | Yadav | H04L 41/16 |
| 2019/0265971 A1 | 8/2019 | Behzadi et al. | |
| 2020/0084142 A1 * | 3/2020 | Bochkar | H04L 47/125 |
| 2020/0092801 A1 * | 3/2020 | Boss | H04W 48/18 |
| 2020/0274782 A1 | 8/2020 | Balaiah et al. | |
| 2020/0304523 A1 | 9/2020 | Yadav et al. | |
| 2021/0211363 A1 * | 7/2021 | Papacica | H04L 41/5058 |
| 2022/0052927 A1 * | 2/2022 | Yelahanka Raghuprasad | H04L 43/08 |
| 2022/0078090 A1 * | 3/2022 | Sinha | H04L 41/147 |

* cited by examiner

*Primary Examiner* — Joe Chacko
(74) *Attorney, Agent, or Firm* — Behmke Innovation Group LLC; Kenneth J. Heywood; Jonathon P. Western

(57) ABSTRACT

In one embodiment, a device receives application experience metrics for a software-as-a-service application served by a plurality of application endpoints. The device generates, based on the application experience metrics, a predictive model that predicts application experience scores for connections between a service provider network and the plurality of application endpoints. The device selects a particular application endpoint for the service provider network, based on an application experience score predicted by the predictive model. The device sends an indication an indication of the particular application endpoint selected by the device to the software-as-a-service application. The indication is used to assign a connection between the service provider network and the particular application endpoint.

20 Claims, 12 Drawing Sheets

US 11,729,071 B1

SELECTION OF SAAS ENDPOINT INSTANCES BASED ON LOCAL SERVICE PROVIDER CONNECTIVITY STATISTICS

TECHNICAL FIELD

The present disclosure relates generally to computer networks, and, more particularly, to the selection of software as a service (SaaS) endpoint instances based on local service provider connectivity statistics.

BACKGROUND

Applications are increasingly adopting the software-as-a-service (SaaS) model in which the application is hosted centrally, such as in the cloud. In such deployments, various SaaS endpoints are distributed across different geographic regions, to afford better performance to the clients of the application. For instance, one datacenter for the SaaS application may be located in Asia, while another may be located in Europe.

Traditionally, SaaS endpoint selection is performed at the time during which a client seeks a connection and is based on the instantaneous path metrics to the various endpoints available. For instance, a client endpoint may send pings to the datacenters in both Asia and Europe, and select whichever endpoint offers the lowest latency, jitter, etc. While this approach can lead to an acceptable quality of experience (QoE) with the application, the instantaneous nature of this selection also does not guarantee a satisfactory experience with the application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
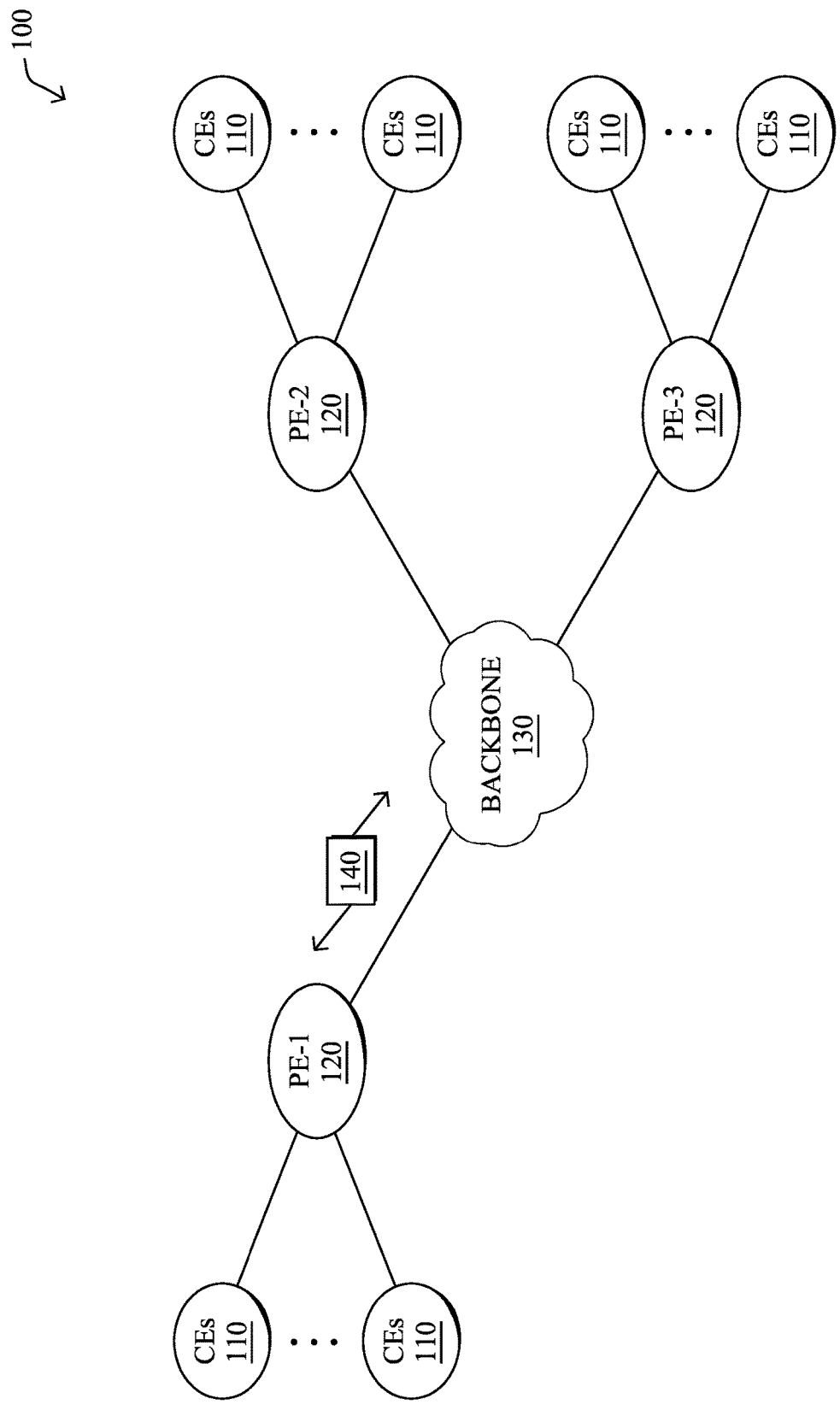
FIGS. 1A-1B illustrate an example communication network.

According to one or more embodiments of the disclosure, a device receives application experience metrics for a software-as-a-service application served by a plurality of application endpoints. The device generates, based on the application experience metrics, a predictive model that predicts application experience scores for connections between a service provider network and the plurality of application endpoints. The device selects a particular application endpoint for the service provider network, based on an application experience score predicted by the predictive model. The device sends an indication an indication of the particular application endpoint selected by the device to the software-as-a-service application. The indication is used to assign a connection between the service provider network and the particular application endpoint.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
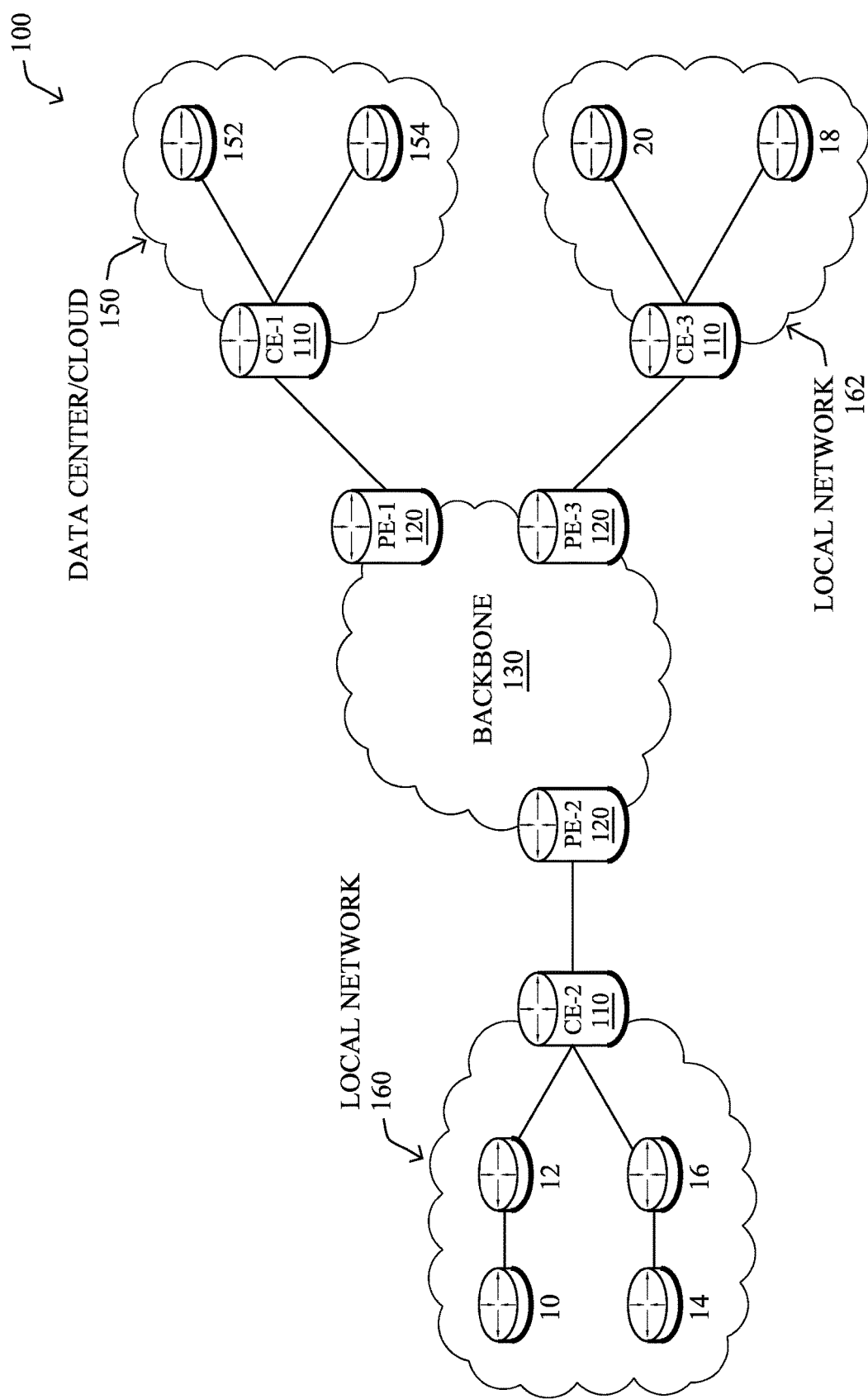

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
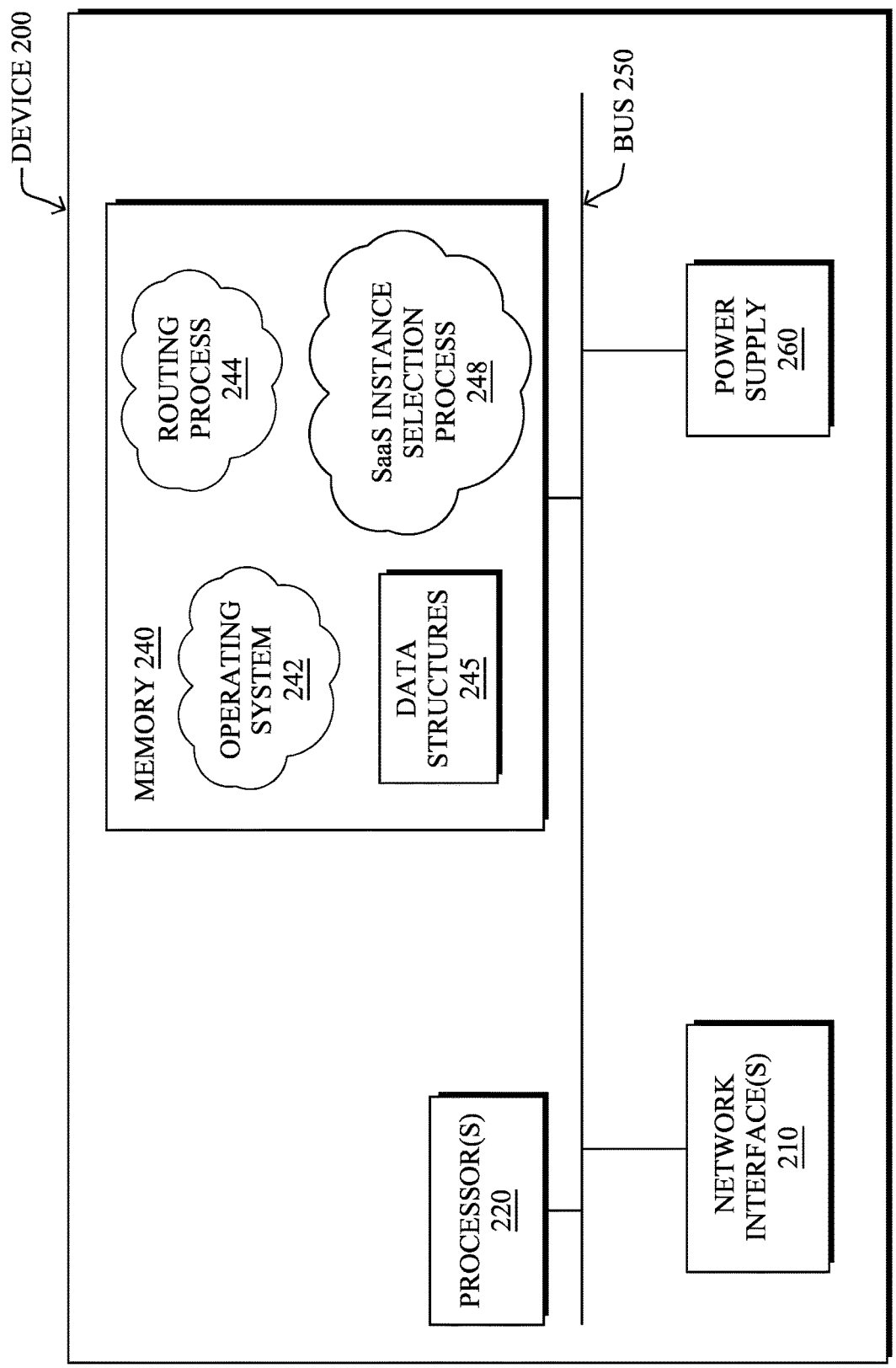
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a SaaS instance selection process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or SaaS instance selection process 248 may also include computer executable instructions that, when executed by processor(s) 220, cause device 200 to perform the techniques described herein. To do so, in some embodiments, routing process 244 and/or SaaS instance selection process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or SaaS instance selection process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or SaaS instance selection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
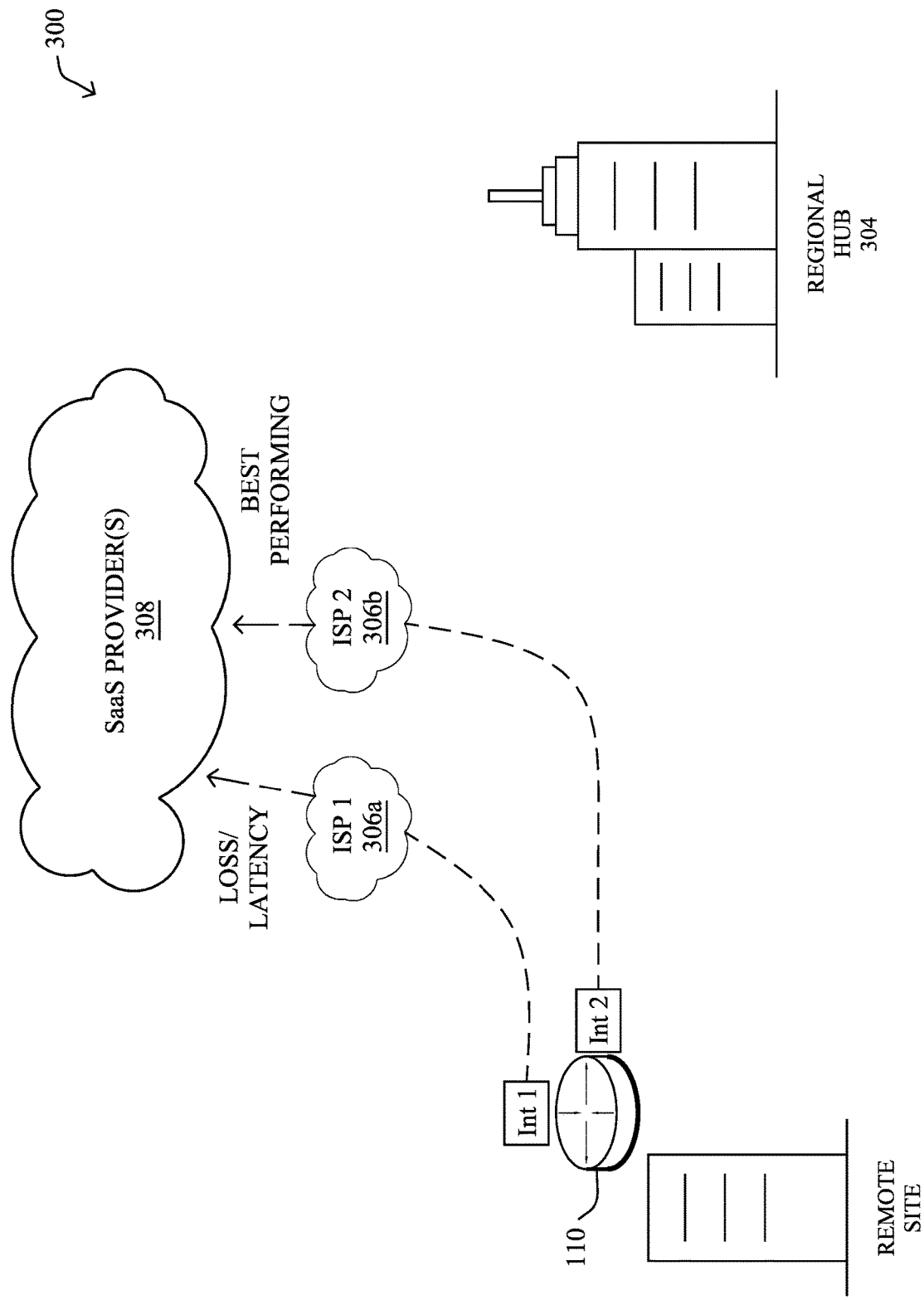
FIGS. 3A-3B illustrate example network deployments.
Figure 3B:
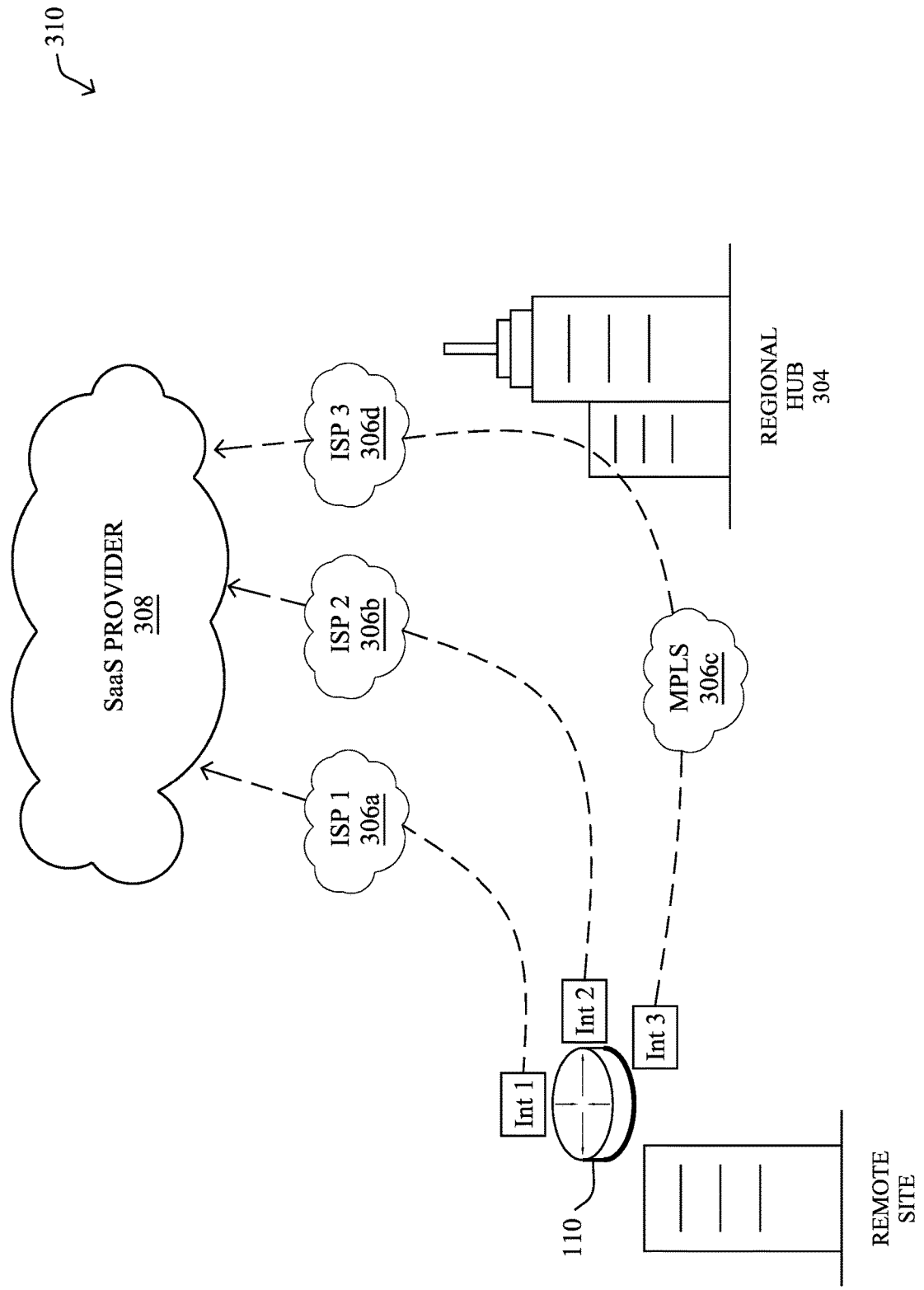

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
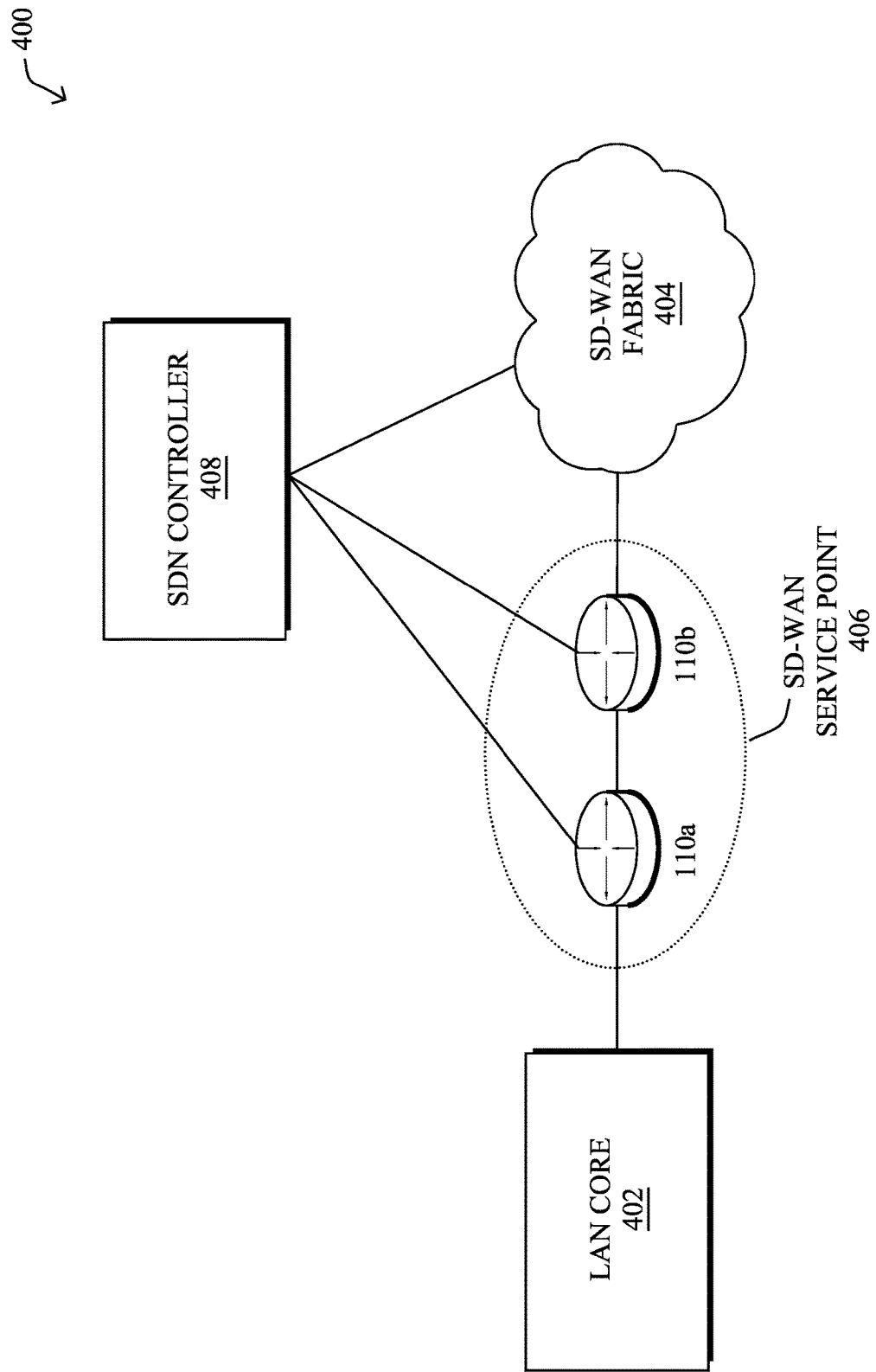
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The tem' 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
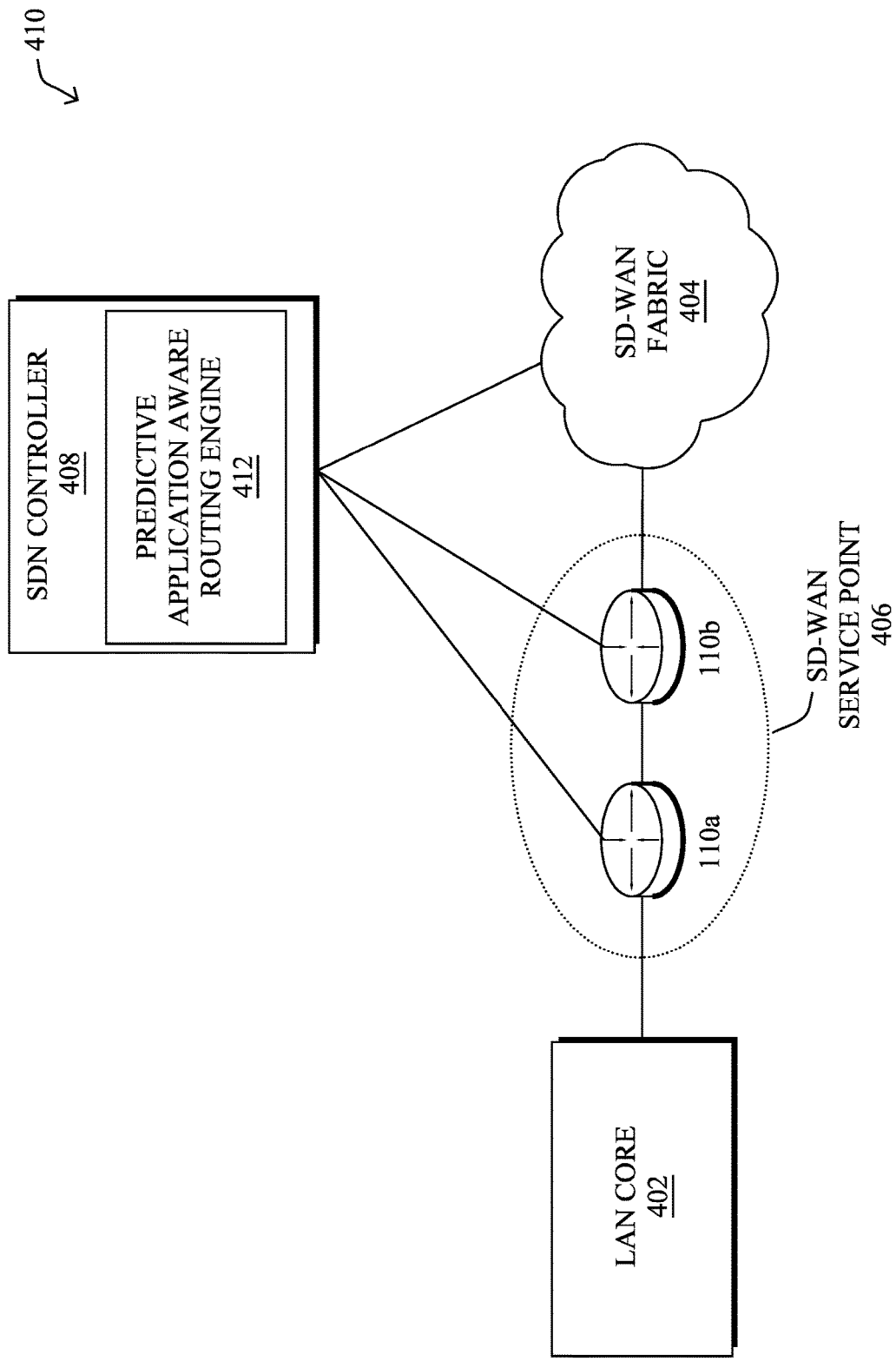

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or SaaS instance selection process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, SaaS applications deploy instances that can serve the software all across the globe. Typically, the endpoint client connects to the 'best' SaaS endpoint instances based on certain heuristics. For example, a videoconferencing SaaS application may ping multiple data centers to which servers are deployed, and then connect to the data center with the least amount of path latency or loss. However, these instantaneous measurements do not utilize the historical data about application experiences, which may be collected over time. As described in greater detail below, it has been found that the geo-region of the endpoint clients, as well as the service provider (SP) that they use, can greatly affect which SaaS instance/endpoint would be the 'optimal' choice for purposes of maximizing the QoE of the application.

By way of example, a client connected to one of the SPs in South Asia may typically connect to a data center located in London, instead of a data center located in Singapore, if the instantaneous path measurements to the London data center had lowest latency when the application initiated the session. However, past data may clearly indicate that such a data center is sub-optimal for application experience for the given SP in that city. The historical data might also indicate which data centers are better at different times-of-the-day. Furthermore, the client may not even consider certain metrics, such as packet loss, because doing so would be too time intensive upon startup of the application (e.g., the user would be forced to wait for a period of time before connecting), Despite this, packet loss can also greatly affect the QoE of the application.

Selection of SaaS Endpoint Instances Based on Local SP Connectivity Statistics

The techniques introduced herein allow an endpoint client to connect to the SaaS application endpoint/instance that offers the predicted 'best' QoE, by taking into account the historical metrics for the connections to the various SaaS endpoint and QoE metrics for the application. In various aspects, as detailed below, systems and methods are introduced herein to: a.) monitor the SaaS endpoint connectivity and application experience from a given router, b.) score, rank and predict the experience with the SaaS at a given point in time from a router to all SaaS endpoints, c.) choose the best endpoint based predicted experiences and d.) communicate the best end-point to the SaaS endpoint. Custom messaging is also introduced herein between the SaaS and the endpoint selector system, both for the collection of experience and other metrics, as well as to indicate the best SaaS endpoint for a particular client. As would be appreciated, the techniques herein are also such that clients are not required to change SP's or connectivity options.

Illustratively, the techniques described herein may be performed by hardware, software, and/or firmware, such as in accordance with SaaS instance selection process 248, which may include computer executable instructions executed by the processor 220 (or independent processor of interfaces 210) to perform functions relating to the techniques described herein (e.g., in conjunction with routing process 244).

Specifically, according to various embodiments, a device receives application experience metrics for a software-as-a-service application served by a plurality of application endpoints. The device generates, based on the application experience metrics, a predictive model that predicts application experience scores for connections between a service provider network and the plurality of application endpoints. The device selects a particular application endpoint for the service provider network, based on an application experience score predicted by the predictive model. The device sends an indication an indication of the particular application endpoint selected by the device to the software-as-a-service application. The indication is used to assign a connection between the service provider network and the particular application endpoint.

Figure 5:
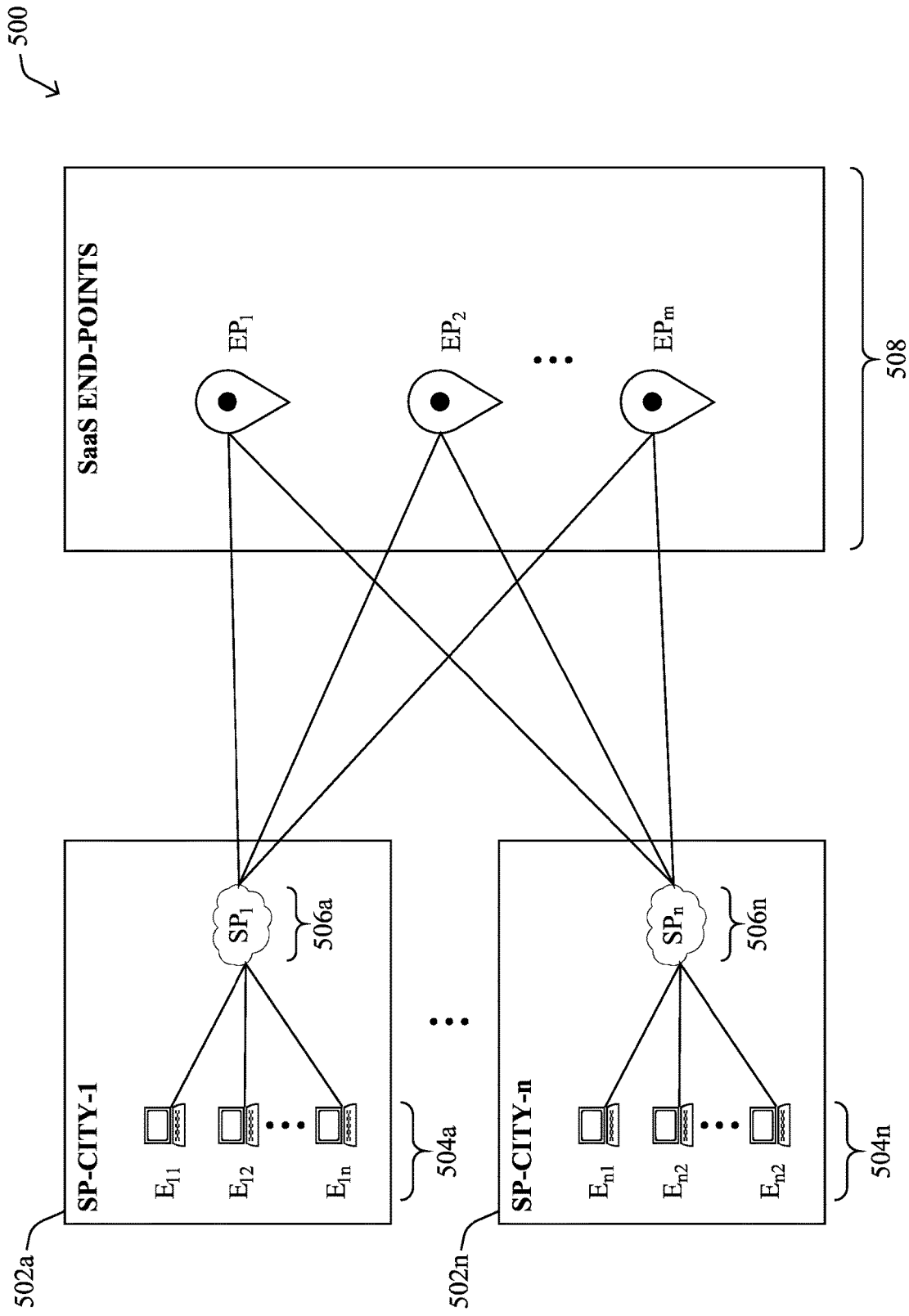
FIG. 5 illustrates an example of multiple software as a service (SaaS) endpoints.

Operationally, FIG. 5 illustrates an example of multiple software as a service (SaaS) endpoints, according to various embodiments. As shown, consider a network 500 that comprises a SaaS provider having m-number of SaaS endpoints 508 (e.g., $EP_1, EP_2, \ldots, EP_m$), each of which may take the form of a single server or data center that serves the SaaS application. In addition, as shown, there may also be any number of client endpoints 504 that connect to the SaaS application served by SaaS endpoints 508. To do so, each endpoint 504 may connect to one of n-number of service providers 506.

As noted, a key observation is that application QoE and network connection performance metrics often differ between cities/geographic regions, even for the same SP. Accordingly, the techniques herein propose treating SPs 506 at a selected granularity, such as at the city-level. Hence, two cities with the same service provider may be treated as having different SPs, for purposes of the technique herein.

For instance, as shown, assume that client endpoints 504*a* are all located within the same city use SP 506*a* for network connectivity. In such a case, a logical grouping 502*a* can be formed to group these client endpoints 504*a* with their city-specific SP 506*a*. This process may repeat for the n-number of cities or other regions under scrutiny. For instance, logical grouping 502*n* may include endpoints 504*n* that are all located in the same city and use SP 506*n* for network connectivity. Note that SP 506*a* and SP 506*n* may be from different providers or the same provider and are treated as separate entities herein.

Typically, the selection of which SaaS endpoint 508 to use is dependent only on the instantaneous path metrics between the client endpoint 504 and the SaaS endpoints 508. For instance, assume that client endpoint $E_{11}$ in client endpoints 504*a* is attempting to establish a connection with SaaS endpoints 508. In such a case, the ping results with the various SaaS endpoints 508 may be leveraged, to select the SaaS endpoint with which $E_{11}$ should connect. However, this approach does not guarantee acceptable QoE for the application, as the instantaneous path metrics may be vastly different than the norm.

Figure 6:
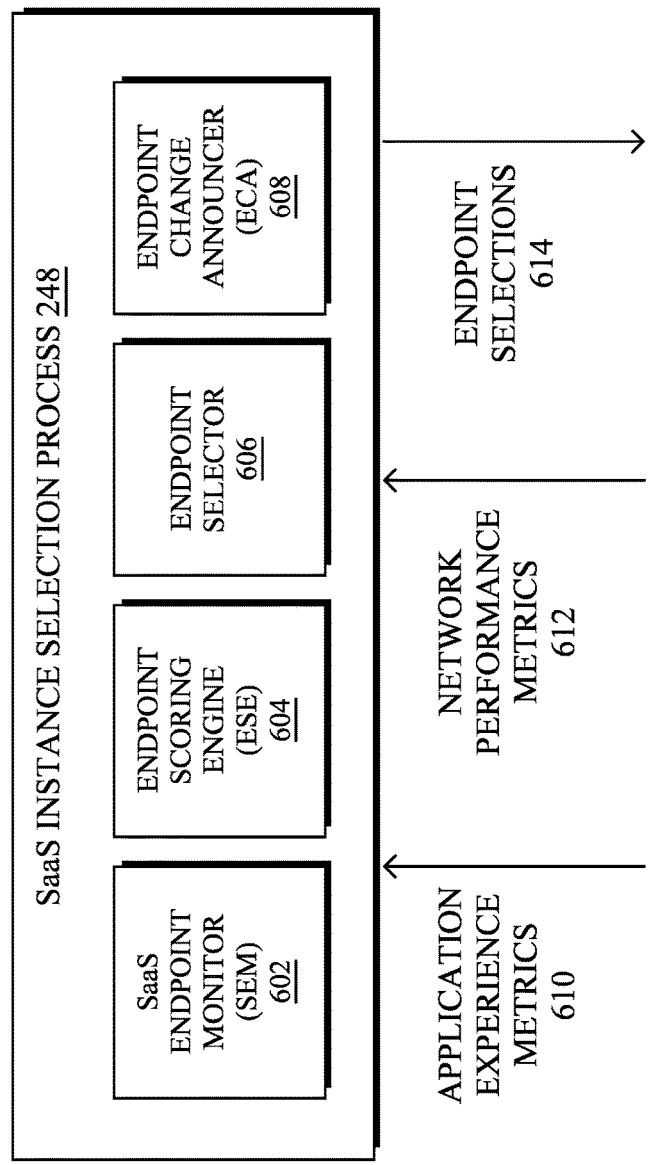
FIG. 6 illustrates an example architecture for selecting a SaaS endpoint.

FIG. 6 illustrates an example architecture for selecting a SaaS endpoint, according to various embodiments. At the core of architecture 600 is SaaS instance selection process 248, which may be executed by a supervisory device of a network or another device in communication therewith. For instance, SaaS instance selection process 248 may be executed by an SDN controller (e.g., SDN controller 408 in FIGS. 4A-4B), a particular networking device in the network (e.g., a router, etc.), an endpoint (e.g., a client endpoint 504 or an SaaS endpoint 508), or another device in communication therewith. In other cases, SaaS instance selection process 248 may be executed in whole, or in part, by a networking device in the network, such as a border router, etc.

As shown, SaaS instance selection process 248 may include any or all of the following components: an SaaS endpoint monitor (SEM) 602, an endpoint scoring engine (ESE) 604, an endpoint selector 606, and/or an endpoint change announcer (ECA) 608. As would be appreciated, the functionalities of these components may be combined or omitted, as desired. In addition, these components may be implemented on a singular device or in a distributed manner, in which case the combination of executing devices can be viewed as their own singular device for purposes of executing SaaS instance selection process 248.

According to various embodiments, SEM 602 may be responsible for responsible for monitoring the connectivity and application experiences from a given SP in a city (or other geographic area) to all the observed SaaS endpoints. To do so, SaaS instance selection process 248 may obtain application experience metrics 610 indicative of the QUE of the SaaS application for its various users. For instance, SaaS instance selection process 248 may leverage an application experience ingestion application programming interface (API) with the SaaS application provider. In turn, the SaaS provider may publish data about the application experience to SaaS instance selection process 248 periodically (e.g., once every ten minutes) on demand, or at any other time. In other cases, SaaS instance selection process 248 may first request application experience metrics 610 from the SaaS application.

A sample set of application experience metrics 610 is as follows:

Application Name
Session ID
Endpoint ID: Server Name
Data center ID: data center to which the server belongs
Time Period
Application Experience (e.g., a score from 1-100, discrete categories such as {good, bad, no-opinion}, etc.)

In other words, the application experience metrics may be user-specified during or after their use of the SaaS application. For instance, a web conferencing application may, ask the attendees of a virtual meeting to rate their experience on a scale from 1-5, 1-10, 1-100, etc., on conclusion of the meeting.

Similarly, SaaS instance selection process 248 may also obtain network performance metrics 612 regarding the connections between the clients and the SaaS servers, either directly from the SaaS application or from the networking devices that supported the connections between the clients and the SaaS endpoints. For instance, network performance metrics 612 may include any or all of the following:

Loss
Latency
Jitter
Bitrate

As would be appreciated, the above metrics may be combined into a singular report with application experience metrics 610, as desired. Regardless, application experience metrics 610 may be collected for the clients of the SaaS application and the SaaS endpoints for their connections over time.

In another embodiment, application experience metrics 610 and/or network performance metrics 612 may include aggregate metrics across sessions/connections, as opposed to being for each session/connection, such as for all of the traffic egressing from a given router or a subnet of routers. In such cases, usually the distribution of network metrics network performance metrics 612 (instead of one value) may be provided. This is important to ensure that the data contains both the average performance of sessions, but also the performance for extreme sessions, which may be rare but still of interest. The aggregate metrics may also indicate the number of requests that were made from the given router to the given endpoint.

In a further embodiment, SaaS instance selection process 248 may initiate collection of network performance metrics 612, such as by probing the SaaS endpoints with Layer 7 HTTP pings, to monitor the network metrics (e.g., loss, latency, jitter, etc.) over time.

As shown, SaaS instance selection process 248 may also include ESE 604, which is responsible for analyzing application experience metrics 610 and network performance metrics 612, to model the connections between the SPs at a given granularity (e.g., per-city) and the various SaaS endpoints. In the first phase, ESE 604 may periodically score the application experiences from each SP ($SP_i$) to all possible SaaS endpoints/data centers observed in the data. For example, if the application experiences are continuous values in a given range, then ESE 604 may compute the application experience score as the median application experience per session for a given time-period (e.g., 10 minutes). Application scores for a given SP may also vary drastically between SaaS endpoints to which it connects. For instance, FIG. 7 illustrates an example plot 700 of application experience scores for an SaaS application observed in a live network.

Figure 7:
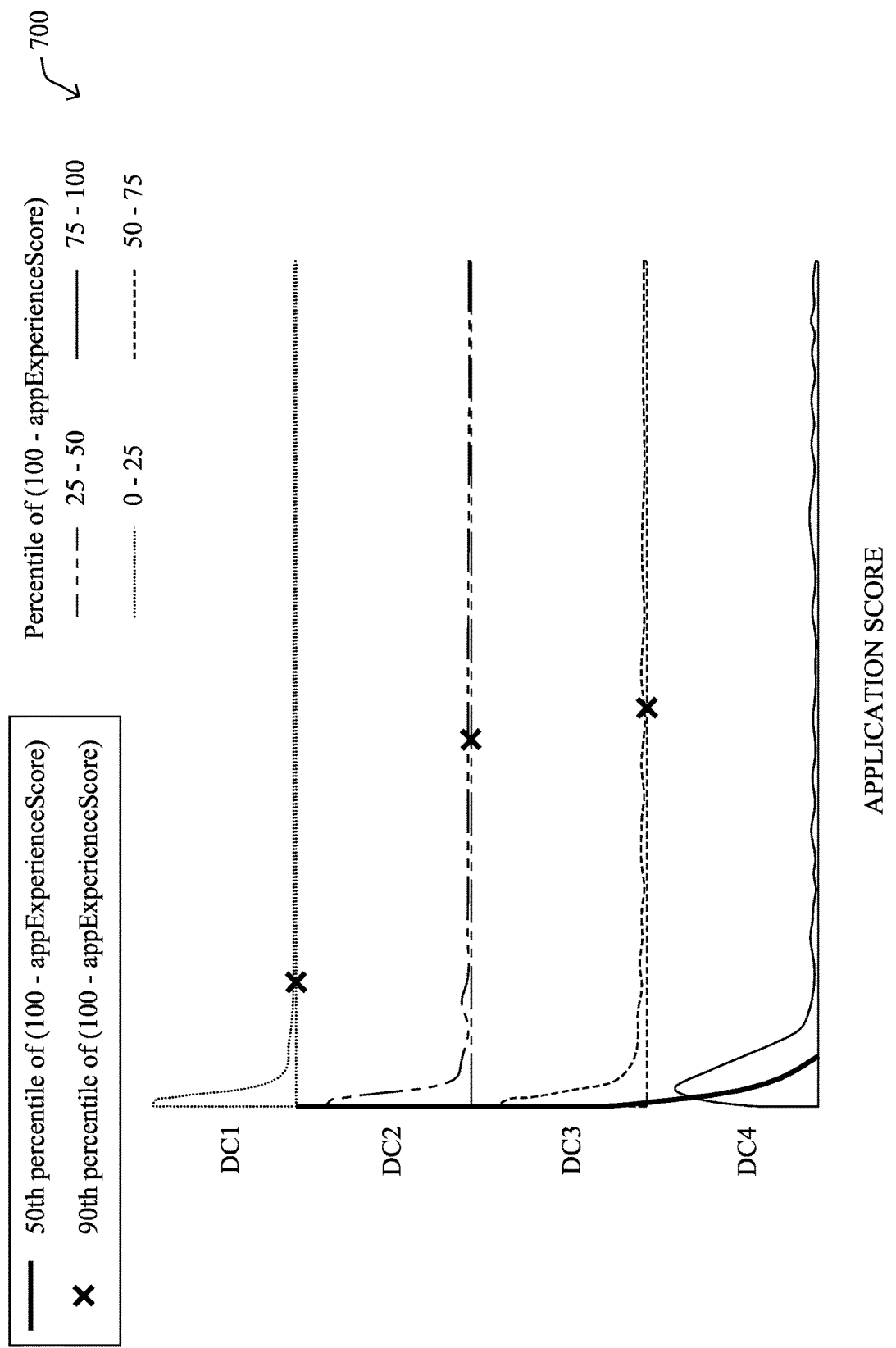
FIG. 7 illustrates an example plot of application experience scores.

As shown in FIG. 7, plot 700 shows the distributions of application experience scores on a 0-100 scale for four different SaaS endpoints/data centers (DC1-DC4) to which a particular city-specific SP connected over the span of five days. Here, it can be seen that the (100-appExperienceScore) distribution for DC4 is considerably worse than that of DC1-DC3. In other words, even though DC4 was selected as being the 'best' SaaS endpoint for that city-specific SP at certain times, the QoE that it afforded to those corresponding users was considerably worse than the other selected SaaS endpoints.

Referring again to FIG. 6, ESE 604 may assess both application experience metrics 610 and network performance metrics 612 for purposes of scoring the various SaaS endpoints to which the SP connected. For example, a weighted score can be constructed by mixing the networking metrics and application experience. In case where the application experience is an ordinal value, such as {GOOD, BAD, NO-OPINION}, ESE 604 may take the one with the highest frequency as the representative application metric. The output of ESE 604 may take the form of one or more metric timeseries that scores the effectiveness of application (e.g., application experience score) from any given SP to all SaaS endpoints observed.

According to various embodiments, endpoint selector 606 may be responsible for selecting the best SaaS endpoint to which a particular SP should connect. To do so, endpoint selector 606 may construct and use a predictive model that takes as input the timeseries from ESE 604 and predicts the application experience metrics for each possible connection between the SP and the various SaaS endpoints. In a simple embodiment, the predictive model may take the form of a bipartite graph between SPs on one side, and SaaS endpoints on the other side, with each edge between SP and SaaS endpoint having the weight of 'applicationExperienceScore' for that pair. In one implementation, the weights of this edge can be replaced with the most recent applicationExperienceScore, such as when new application experience metrics 610 is ingested by SEM 602. In turn, endpoint selector 606 may select the SaaS endpoint with the largest applicationExperienceScore value as the best endpoint for that SP.

In another embodiment, endpoint selector 606 may construct a bipartite graph is between a given SP and data center, instead of individual server endpoints on the SaaS end. In this case, the applicationExperienceScore between the SP and data center can be computed as the overall median across all servers in the data-center. For instance, FIG. 8 illustrates an example graph 800 showing how the metric (100-applicationExperienceScore) varies between different datacenters from 20 SPs (city-granularity) for a single SaaS application.

Figure 8:
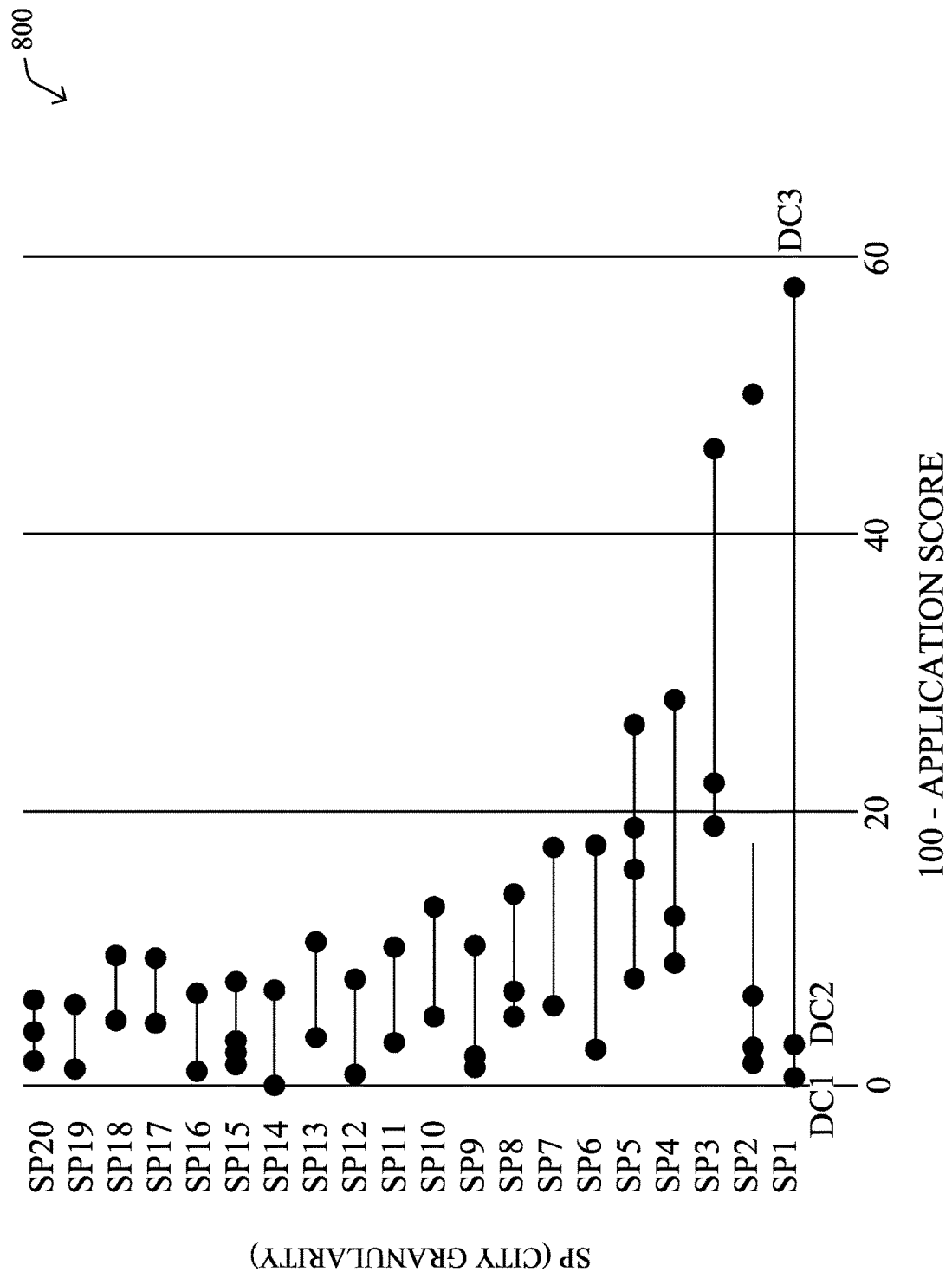
FIG. 8 illustrates another example graph of application experience scores.

As shown in FIG. 8, each point in graph 800 for a particular SP represents a connection between that SP and a particular endpoint datacenter (DCx) of the SaaS application. For instance, SP1 located in a particular city connected to three different datacenters of the SaaS application, with a large variation in their application scores. Indeed, the application experience scores for DC1 and DC2 were quite good, while score for DC3 is very bad, indicating poor user experience when connected to that datacenter.

Referring again to FIG. 6, endpoint, selector 606 may take as input the timeseries of applicationExperienceScore for each SP-SaaS endpoint connection from ESE 604. In turn, endpoint selector 606 may build a machine learning-based model that predicts the applicationExperienceScore at a future time (e.g., in the next hour, etc.). Depending on the type of data, an appropriate forecasting model can be used. For example, the model may take the form of an Autoregressive Integrated Moving Average (ARIMA) model, Facebook Prophet model, simple regression model with time-based features, or even a recursive neural network model. Regardless, endpoint selector 606 may use the predicted experience score to update the bipartite graph and choose the edge/connection between a particular SP-SaaS endpoint pair that afford the best predicted application experience.

In yet another embodiment, endpoint selector 606 may use statistical techniques to assess each pair of endpoints from a given SP (e.g., $<SP_1\text{-}EP_A>$ and $<SP_1\text{-}EP_B>$) in terms of their application experience scores and network path metrics. For example, endpoint selector 606 may compare the application score distribution over $<SP_1\text{-}EP_A>$ and that over $<SP_1\text{-}EP_B>$ using one-sided, two-sample hypothesis tests, such as Anderson Darling or Mann Whitney U Tests. Such a test will provide the p-value stating if the application experience over $<SP_1\text{-}EP_B>$ is significantly better than that of $<SP_1\text{-}EP_A>$. If the p-value is lesser than a threshold (e.g., <0.05), then it can be assumed that it is likely that $<SP_1\text{-}EP_B>$ has better application experience than $<SP_1\text{-}EP_A>$. Similarly, endpoint selector 606 may compare all pair between SP1 to different SaaS endpoints, order the endpoints based on pair-wise comparisons, and select the endpoint with the best statistical experience. In yet another embodiment, application experience and network metrics (e.g., loss, latency) distributions can be tested and the endpoint with best network and application scores selected.

Finally, SaaS instance selection process 248 may include ECA 608, which is responsible for communicating the best SaaS endpoint(s) to the SaaS application. There can be several ways to announce the best endpoint. In one embodiment, the SaaS application may subscribe to the announcements via a message broker. In this case, ECA 608 may push indications of endpoint selections 614 to the message broker, such as whenever there is a new forecast is available for all or some SPs. In another embodiment, the SaaS application may send an endpoint selection request to SaaS instance selection process 248 (e.g., via an API), whenever a new client request arises. In turn, ECA 608 may return an indication of endpoint selections 614. Optionally, the SaaS application may also send such requests, periodically, to get the best endpoints for a given Si'.

Figure 9:
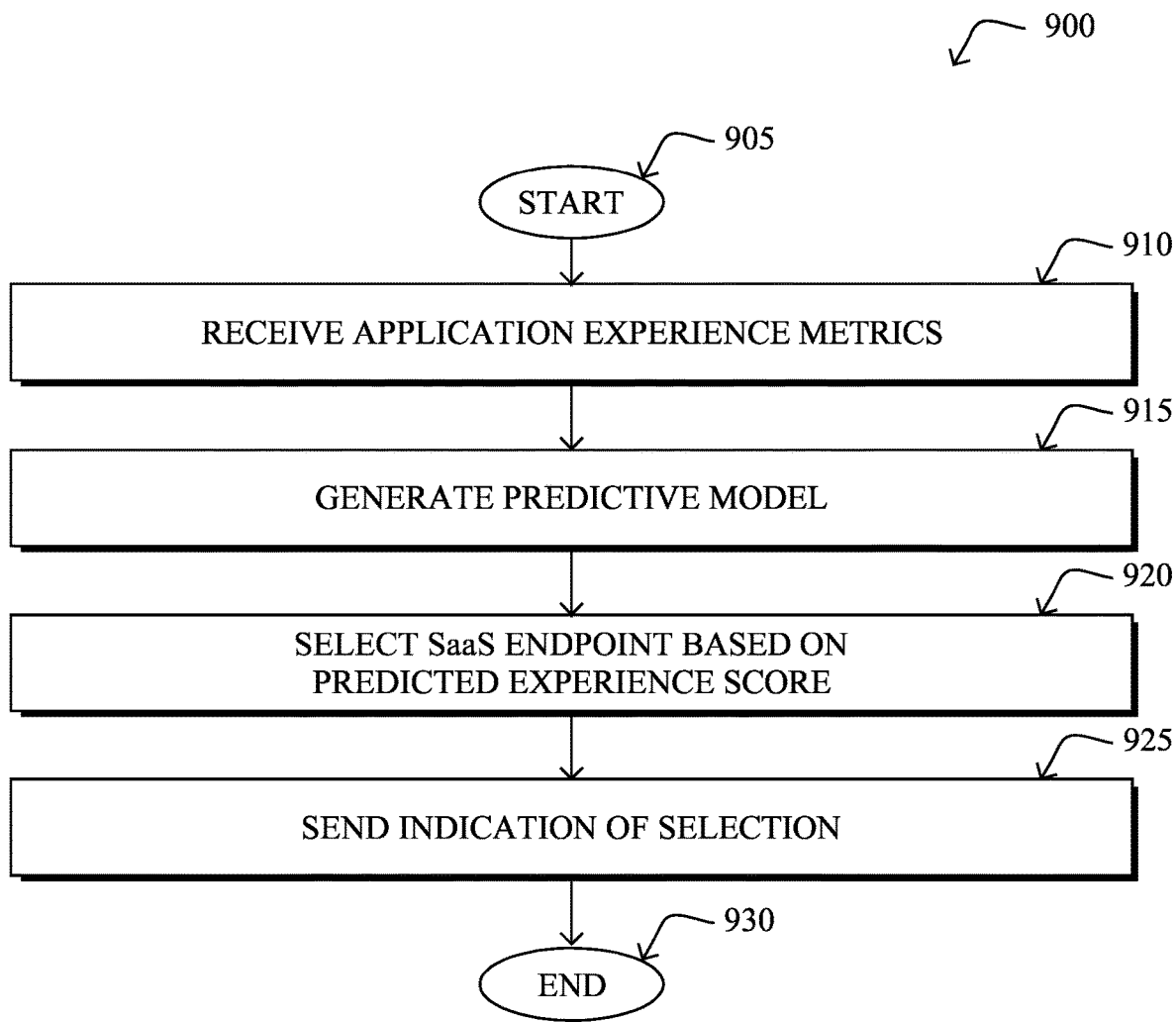
FIG. 9 illustrates an example simplified procedure for selecting an SaaS endpoint.

FIG. 9 illustrates an example simplified procedure 900 for selecting an SaaS endpoint, in accordance with one or more embodiments described herein. For example, a non-generic, specifically configured device (e.g., device 200), such as a networking device (e.g., a router, an SDN controller for an SD-WAN, an SaaS endpoint, an SaaS application client, etc.), or a device in communication therewith, may perform procedure 900 by executing stored instructions (e.g., SaaS instance selection process 248). The procedure 900 may start at step 905, and continues to step 910, where, as described in greater detail above, the device may obtain application experience metrics for the SaaS application, which is served by a plurality of application endpoints. For instance, such experience metrics may be on a per-connection basis or aggregated and represent the degrees of satisfaction that the users of the application had with it. In various embodiments, the device may also obtain network performance metrics for the connections, such as loss, latency, jitter, and/or bitrate metrics. In some instance, the device may receive the application experience and/or network performance metrics via an exposed API, message broker, or the like.

At step 915, as detailed above, the device may, based on the application experience metrics, a predictive model that predicts application experience scores for connections between a service provider network and the plurality of application endpoints. According to various embodiments, the service provider network may be a city-specific network (e.g., limited to a particular metropolitan area, even if the service provider services multiple areas). Such application endpoints may comprise individual servers/instance or datacenters at which multiple servers are located.

At step 920, the device may select a particular application endpoint for the service provider network, based on an application experience score predicted by the predictive model, as described in greater detail above. For instance, the device may predict that a connection between an SP1 and an SaaS datacenter DC2 may offer the best predicted application experience score. In turn, the device may select that endpoint/datacenter for the SP. In various embodiments, the predictive model may take the form of a statistical model or, alternatively, a machine learning-based model.

At step 925, as detailed above, the device may send an indication of the particular application endpoint selected by the device to the software-as-a-service application, wherein the indication is used to assign a connection between the service provider network and the particular application endpoint. In one embodiment, the device may send the indication to a message broker to which the software-as-a-service application is subscribed. In another embodiment, the device may send the indication in response to the device receiving an endpoint selection request from the application. Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage the historical application experience data to select the 'best' SaaS endpoint(s) to which a (city-specific) service provider should connect. In some aspects, this historical data can be used to predict which endpoint will afford the best application experience. Doing so may result in better overall performance, as current approaches rely s the instantaneous path metrics available at the time a connection is made.

While there have been shown and described illustrative embodiments that provide for selecting the optimal SaaS endpoint to which a client device should connect, it is to be understood that various other adaptations and modifications may be made within the spirit and scope of the embodiments herein. For example, while certain embodiments are described herein with respect to using certain models for purposes of predicting application experience scores, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
receiving, at a device, application experience metrics for a software-as-a-service application served by a plurality of application endpoints;
generating, by the device and based on the application experience metrics, a predictive model that predicts application experience scores for connections between a service provider network and the plurality of application endpoints;
selecting, by the device, a particular application endpoint for the service provider network, based on an application experience score predicted by the predictive model; and
sending, by the device, an indication of the particular application endpoint selected by the device to the software-as-a-service application, wherein the indication is used to assign a connection between the service provider network and the particular application endpoint.

2. The method as in claim 1, wherein the device receives the application experience metrics via an application programming interface.

3. The method as in claim 1, further comprising:
receiving, at the device, network performance metrics for the connections between the service provider network and the plurality of application endpoints, wherein the predictive model is generated further in part on the network performance metrics.

4. The method as in claim 3, wherein the network performance metrics comprise loss, latency, bitrate, or jitter metrics.

5. The method as in claim 1, wherein the device sends the indication to a message broker to which the software-as-a-service application is subscribed.

6. The method as in claim 1, wherein the device sends the indication to the software-as-a-service application, in response to receiving an endpoint selection request.

7. The method as in claim 1, wherein the plurality of application endpoints comprises different data centers or servers.

8. The method as in claim 1, wherein the application experience metrics are specified by users of the software-as-a-service application.

9. The method as in claim 1, wherein the service provider network is a city-specific service provider network.

10. The method as in claim 1, wherein the device is a controller for a software-defined wide area network (SD-WAN).

11. An apparatus, comprising:
one or more network interfaces;
a processor coupled to the one or more network interfaces and configured to execute one or more processes; and
a memory configured to store a process that is executable by the processor, the process when executed configured to:
receive application experience metrics for a software-as-a-service application served by a plurality of application endpoints;
generate, based on the application experience metrics, a predictive model that predicts application experience scores for connections between a service provider network and the plurality of application endpoints;
select a particular application endpoint for the service provider network, based on an application experience score predicted by the predictive model; and
send an indication of the particular application endpoint selected by the apparatus to the software-as-a-service application, wherein the indication is used to assign a connection between the service provider network and the particular application endpoint.

12. The apparatus as in claim 11, wherein the apparatus receives the application experience metrics via an application programming interface.

13. The apparatus as in claim 11, wherein the process when executed is further configured to:
receive network performance metrics for the connections between the service provider network and the plurality of application endpoints, wherein the predictive model is generated further in part on the network performance metrics.

14. The apparatus as in claim 13, wherein the network performance metrics comprise loss, latency, bitrate, or jitter metrics.

15. The apparatus as in claim 11, wherein the apparatus sends the indication to a message broker to which the software-as-a-service application is subscribed.

16. The apparatus as in claim 11, wherein the apparatus sends the indication to the software-as-a-service application, in response to receiving an endpoint selection request.

17. The apparatus as in claim 11, wherein the plurality of application endpoints comprises different data centers or servers.

18. The apparatus as in claim 11, wherein the application experience metrics are specified by users of the software-as-a-service application.

19. The apparatus as in claim 11, wherein the service provider network is a city-specific service provider network.

20. A tangible, non-transitory, computer-readable medium storing program instructions that cause a device to execute a process comprising:
receiving, at the device, application experience metrics for a software-as-a-service application served by a plurality of application endpoints;
generating, by the device and based on the application experience metrics, a predictive model that predicts application experience scores for connections between a service provider network and the plurality of application endpoints;
selecting, by the device, a particular application endpoint for the service provider network, based on an application experience score predicted by the predictive model; and
sending, by the device, an indication of the particular application endpoint selected by the device to the software-as-a-service application, wherein the indication is used to assign a connection between the service provider network and the particular application endpoint.

* * * * *

UNITED STATES PATENT AND TRADEMARK OFFICE
CERTIFICATE OF CORRECTION

PATENT NO. : 11,729,071 B1
APPLICATION NO. : 17/190811
DATED : August 15, 2023
INVENTOR(S) : Vinay Kumar Kolar et al.

It is certified that error appears in the above-identified patent and that said Letters Patent is hereby corrected as shown below:

In the Specification

Column 9, Line 21, please amend as shown:
The term 'SLA failure' refers to a situation in which the Column 10, Line 43, please amend as shown:
necting). Despite this, packet loss can also greatly affect the Column 10, Line 57, please amend as shown:
the best endpoint based predicted experiences; and d.) com Column 10, Line 64, please amend as shown:
required to change SPs or connectivity options.

Column 12, Line 25, please amend as shown:
application experience metrics 610 indicative of the QoE of Column 12, Line 32, please amend as shown:
once every ten minutes), on demand, or at any other time. In Column 12, Line 47, please amend as shown:
tion. For instance, a web conferencing application may ask Column 14, Line 29, please amend as shown:
Referring again to FIG. 6, endpoint selector 606 may take Column 15, Line 11, please amend as shown:
the best endpoints for a given SP.

Signed and Sealed this
Fourteenth Day of November, 2023

Katherine Kelly Vidal
*Director of the United States Patent and Trademark Office*

CERTIFICATE OF CORRECTION (continued)
U.S. Pat. No. 11,729,071 B1

Column 16, Line 11, please amend as shown:
performance, as current approaches rely solely on the instantaneous